US008200376B2

(12) United States Patent
Mattingly et al.

(10) Patent No.: US 8,200,376 B2
(45) Date of Patent: Jun. 12, 2012

(54) VEHICLE PERFORMANCE MONITORING SYSTEM WITH MULTI-LEVEL CACHING

(75) Inventors: Patrick Mattingly, Palmdale, CA (US); James Bretz, Lancaster, CA (US); Michael Burt, Palmdale, CA (US)

(73) Assignee: Symvionics, Inc., Arcadia, CA (US)

( * ) Notice: Subject to any disclaimer, the term of this patent is extended or adjusted under 35 U.S.C. 154(b) by 999 days.

(21) Appl. No.: 11/830,332

(22) Filed: Jul. 30, 2007

(65) Prior Publication Data

US 2009/0037034 A1 Feb. 5, 2009

(51) Int. Cl.
*G05D 1/00* (2006.01)

(52) U.S. Cl. .................... 701/3; 701/2; 701/23; 701/24; 701/29.1; 701/31.4; 701/31.5; 701/34.4; 701/99; 244/189; 244/190; 244/194; 340/963; 340/993

(58) Field of Classification Search ........................ None
See application file for complete search history.

(56) References Cited

U.S. PATENT DOCUMENTS

| | | | | |
|---|---|---|---|---|
| 6,122,572 | A * | 9/2000 | Yavnai | 701/23 |
| 6,353,734 | B1 * | 3/2002 | Wright et al. | 455/98 |
| 7,103,456 | B2 * | 9/2006 | Bloch et al. | 701/3 |
| 7,149,612 | B2 | 12/2006 | Stefani et al. | |
| 7,328,012 | B2 * | 2/2008 | Ziarno et al. | 455/431 |
| 7,451,023 | B2 * | 11/2008 | Appleby et al. | 701/24 |
| 7,466,980 | B2 * | 12/2008 | Kauffman et al. | 455/431 |
| 7,489,992 | B2 * | 2/2009 | Valette et al. | 701/34.3 |
| 7,564,347 | B2 * | 7/2009 | Hansen | 340/539.13 |
| 7,611,092 | B2 * | 11/2009 | Silansky et al. | 244/30 |
| 7,822,415 | B2 * | 10/2010 | Meyers et al. | 455/431 |
| 2003/0003872 | A1 * | 1/2003 | Brinkley et al. | 455/66 |
| 2003/0027551 | A1 * | 2/2003 | Rockwell | 455/410 |
| 2003/0065428 | A1 * | 4/2003 | Mendelson et al. | 701/9 |
| 2003/0069015 | A1 * | 4/2003 | Brinkley et al. | 455/431 |
| 2003/0078050 | A1 * | 4/2003 | Carlborg et al. | 455/452 |
| 2003/0083794 | A1 * | 5/2003 | Halm et al. | 701/29 |
| 2003/0158744 | A1 * | 8/2003 | Moitra et al. | 705/1 |
| 2003/0236854 | A1 * | 12/2003 | Rom et al. | 709/217 |
| 2004/0160340 | A1 * | 8/2004 | Thomson et al. | 340/945 |
| 2005/0149238 | A1 * | 7/2005 | Stefani et al. | 701/33 |
| 2005/0171651 | A1 * | 8/2005 | Loda et al. | 701/2 |
| 2006/0106506 | A1 * | 5/2006 | Nichols et al. | 701/3 |
| 2006/0114324 | A1 * | 6/2006 | Farmer et al. | 348/144 |
| 2006/0122925 | A1 * | 6/2006 | Wesby | 705/35 |
| 2006/0184291 | A1 * | 8/2006 | Paradis et al. | 701/23 |
| 2006/0218285 | A1 * | 9/2006 | Talwar et al. | 709/227 |
| 2007/0001830 | A1 * | 1/2007 | Dagci et al. | 340/438 |
| 2007/0130599 | A1 * | 6/2007 | Monroe | 725/105 |
| 2007/0206545 | A1 * | 9/2007 | Lee et al. | 370/338 |
| 2007/0291780 | A1 * | 12/2007 | Smith et al. | 370/411 |
| 2008/0313037 | A1 * | 12/2008 | Root et al. | 705/14 |
| 2009/0081944 | A1 * | 3/2009 | Yavuz et al. | 455/3.01 |
| 2009/0259361 | A1 * | 10/2009 | Tuff | 701/33 |

* cited by examiner

*Primary Examiner* — Jonathan M Dager
(74) *Attorney, Agent, or Firm* — Dickstein Shapiro LLP

(57) ABSTRACT

A system and method for monitoring vehicle performance including multi-level caching. The system includes a vehicle portion with sensors, a vehicle caching data server, and a wireless transceiver and a monitoring station portion with monitoring workstations, a monitoring caching data server, and a wireless transceiver. The monitoring caching data server receives and aggregates requests for vehicle performance data from the monitoring workstations based on request priority and available bandwidth. The vehicle caching data server stores vehicle performance data from the sensors and selectively transmits a subset of the vehicle performance data to the monitoring caching data server in response to aggregate requests.

33 Claims, 3 Drawing Sheets

VEHICLE PERFORMANCE MONITORING SYSTEM WITH MULTI-LEVEL CACHING

BACKGROUND OF THE INVENTION

New vehicle designs must be thoroughly tested before being released to production to ensure safety and operation as intended. Modern testing typically includes outfitting a test vehicle with a plurality of sensors and recording data output by the sensors during a series of tests. For example, an aircraft prototype might be outfitted with sensors to monitor engine performance and the position of control surfaces. During flights tests, data from those sensors is typically transmitted to engineers on the ground for evaluation. Real-time monitoring is particularly advantageous because it allows engineers to continuously evaluate vehicle safety and adjust a test plan based on intermediate results.

Conventionally, a predetermined set of parameters collected by the sensors is transmitted via wireless link to a receiver at a monitoring station. The data is then stored in a shared computer memory at the monitoring station and displayed on engineers' computer screens. The number of parameters that can be stored and monitored, and the temporal resolution and bit depth thereof, is limited by the bandwidth of the wireless link. In addition, data links between the receiver, the shared memory, and the engineer's computers must have very low latency for proper data alignment and synchronization. Conventional vehicle performance monitoring systems also display only real-time vehicle performance data during a vehicle test.

Thus, there is a need in the art for a vehicle performance monitoring system that can accommodate a greater number of parameters, i.e. vehicle sensors, and higher sampling resolution within available wireless link bandwidth while also allowing engineers to view both real-time and historical performance data during and after a vehicle test. There is also a need for a system allowing engineers to individually and selectively display vehicle performance parameters upon request within a limited bandwidth by transmitting only requested parameters from the vehicle to a monitoring station and caching those parameters to obviate duplicate transmissions.

BRIEF SUMMARY OF THE DISCLOSED EMBODIMENTS

The embodiments described herein overcome limitations of the prior art by providing a system and method for monitoring vehicle performance with multi-level caching. The disclosed embodiments include a vehicle portion with sensors, a vehicle caching data server, and a wireless transceiver and a monitoring station portion with monitoring workstations, a monitoring caching data server, and a wireless transceiver. The monitoring caching data server receives and aggregates requests for vehicle performance data from the monitoring workstations based on, for example, request priority and available bandwidth. The vehicle caching data server stores vehicle performance data from the sensors and selectively transmits a subset of the vehicle performance data to the monitoring caching data server via a wireless link in response to aggregate requests.

By transmitting only specifically requested vehicle performance data and storing the other sensor data internally, engineers at the monitoring station are able to selectively access a greater number of parameters within a limited wireless link bandwidth. This more efficient wireless link usage also allows enhanced data sampling rates. These and other aspects and advantages of the disclosed embodiments will be apparent to those of skill in the art upon reading the expanded description of the preferred embodiments that follows.

DESCRIPTION OF THE PREFERRED EMBODIMENTS

In the following detailed description, reference is made to the accompanying drawings, which form a part hereof and show by way of illustration specific embodiments in which the claimed invention may be practiced. These embodiments are described in sufficient detail to enable those skilled in the art to practice them, and it is to be understood that other embodiments may be utilized. The progression of steps described is exemplary of embodiments of the invention. However, the sequence of steps is not limited to that set forth herein and may be changed as is known in the art, with the exception of steps necessarily occurring in a certain order.

Figure 1:
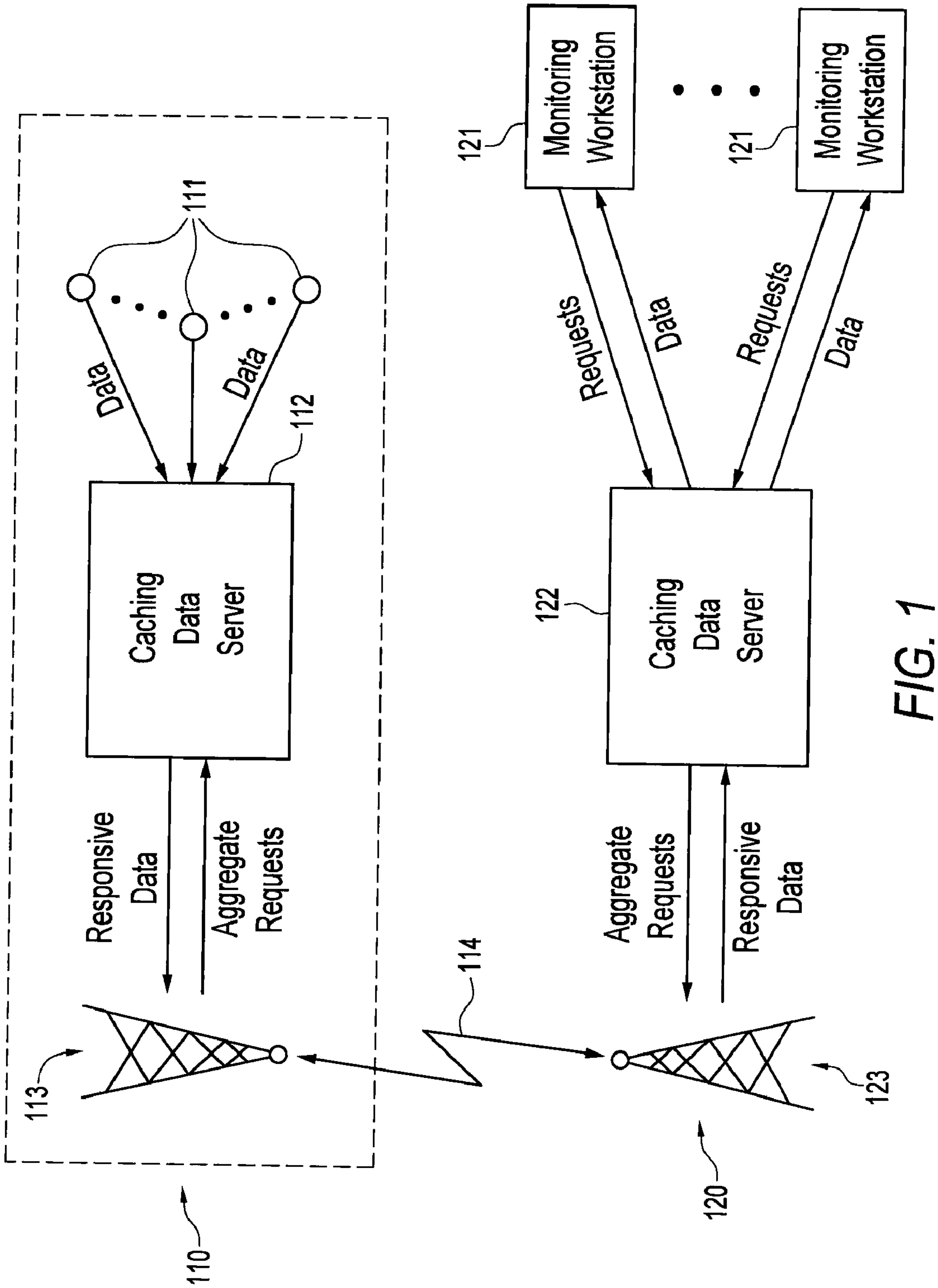
FIG. 1 shows components of a vehicle performance monitoring system and data exchange among those components in accordance with an embodiment disclosed herein.

As shown in FIG. 1, a preferred embodiment comprises two portions, a vehicle portion 110 and a monitoring station portion 120. The vehicle portion comprises a plurality of sensors 111, a vehicle caching data server 112, and a wireless transceiver 113. The sensors, data server, and transceiver can be any known equipment conventionally used in conjunction with the type of vehicle. For example, if the vehicle is an airplane, the sensors might measure altitude, airspeed, airframe stress, and control surface deflection; the data server might be a ruggedized, solid state computer already approved for use in flight operations, such as those currently employed in many commercial and military aircraft; and the transceiver might be a VHF or UHF radio transceiver. The monitoring portion 120 comprises at least one monitoring workstation 121, a monitoring caching data server 122, and a wireless transceiver 123. Both the workstation 121 and the server 120 can be conventionally known computers connected via a wired local area network (LAN), for example a Ethernet network, or wireless electronic devices such as personal digital assistants (PDAs) or cell phones, for example.

The caching data server 112 aboard the vehicle receives and stores data from the plurality of sensors 111. All of the stored sensor data can be retrieved from the vehicle server 112 at the conclusion of a testing series by, for example, removing a hard disk drive or other memory device, or by downloading the data via a cable or wireless connection. However, a subset or possibly all of the sensor data is transmitted to the monitoring station 120 via transceiver 113 and a wireless link 114 in response to requests received from the monitoring station 120. By transmitting only those parameters, i.e. that sensor data, specifically requested by users at the monitoring station 120 and merely storing the other sensor data internally, users are able to selectively access a greater number of parameters within a limited wireless link bandwidth.

A transceiver 123 at the monitoring station receives the parameters transmitted by the vehicle 110 and forwards them to a caching data server 122 which can store them locally.

However, it is contemplated that the caching server also can be remote. In addition, parameters are transmitted via local area network or other means to monitoring workstations 121 associated with the requesting users. Different users may see different subsets of the vehicle performance parameters depending on the scope or orientation of their respective requests. Moreover, because data is stored in a memory, both in the ground caching data server 122 and the vehicle caching data server 112, engineers can request and receive historical vehicle performance data. This historical data could be represented, for example, in a waterfall display and permit an engineer to scroll back in time through past data or scroll forward to more recent or even real-time data.

Figure 2:
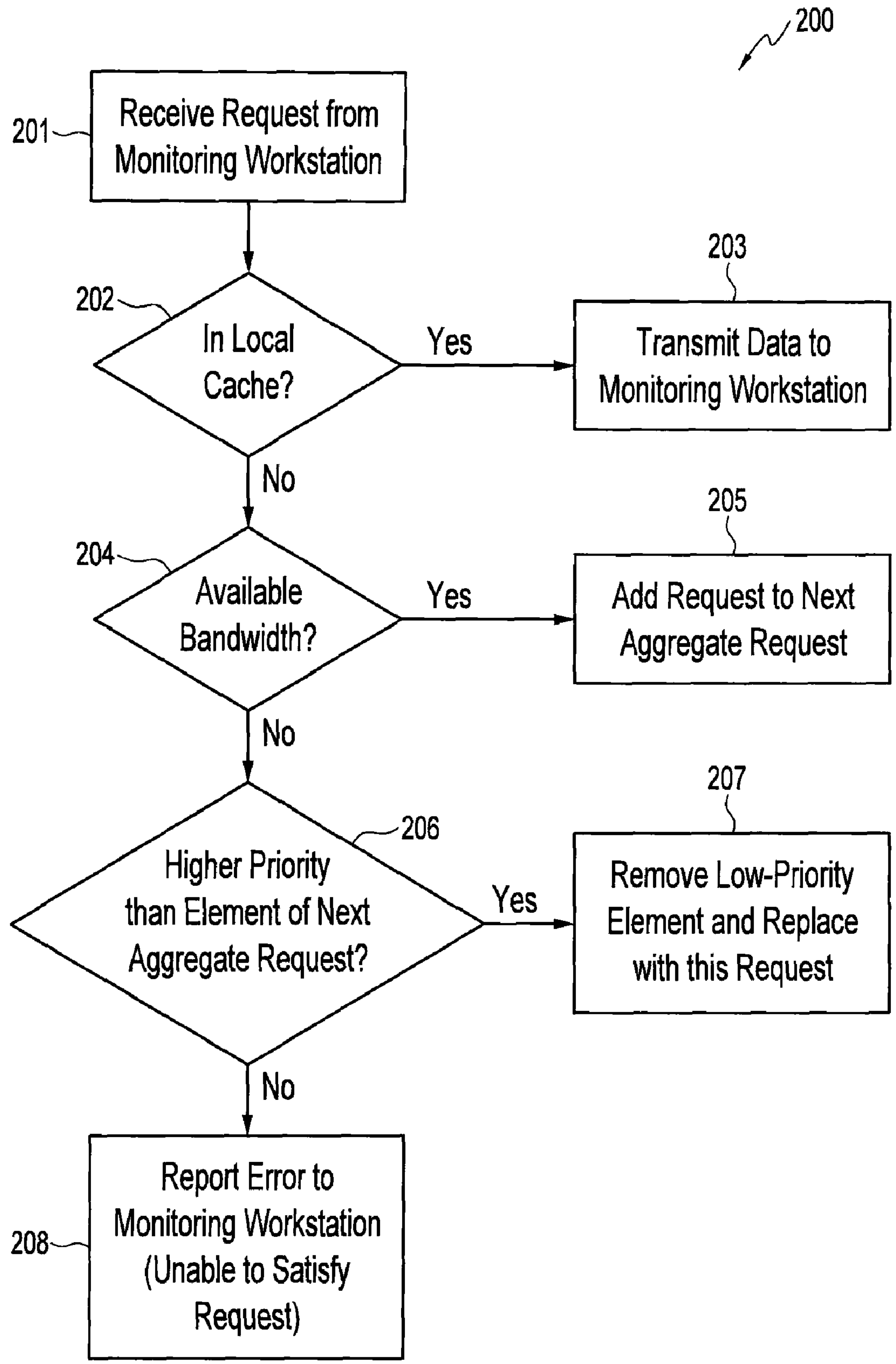
FIG. 2 is a flow chart illustrating a method for handling requests for vehicle performance data according to an embodiment disclosed herein.

The flow chart of FIG. 2 illustrates a method 200 for handling requests for vehicle data, e.g. performance data, according to one embodiment of the disclosure. The method is preferably performed by the caching data server 122 located near or connected to a monitoring station 120, although it could be performed elsewhere, for example in another server at the monitoring station 120, a remote server in communication with the workstations 121, in a workstation 121, or even within the caching data server 112 aboard the vehicle 110. To prevent loss of synchronization and to more effectively manage limited wireless link bandwidth, requests are not immediately and individually passed to the vehicle. Rather, they are evaluated, prioritized, and aggregated to form an aggregate request. The aggregate request is then transmitted to the caching data server aboard the vehicle. In response to the aggregate request, the vehicle transmits the requested data to the caching data server at the monitoring station, which then stores the data locally and distributes portions of it to respective requesters.

The request handling method begins at step 201 when a request for vehicle performance data is received from a user at a monitoring workstation. At step 202, the server determines whether the requested data is already stored in the memory of the caching data server at the monitoring station, because, for example, the same data was the subject of a previous request, then the server transmits the requested data to the requester at step 203. No interaction with the vehicle, and therefore no utilization of wireless link bandwidth, is required to satisfy the request.

Often, however, the requested data will not already be stored in the memory of the monitoring station's caching data server. In this case, the new request must be evaluated to determine whether it will be included in a next aggregate request to the vehicle. In step 204, the server determines whether there is sufficient wireless link bandwidth available to accommodate the new request and all other requests. If so, then the request is added to the next aggregate request at step 205. If there is insufficient bandwidth to accommodate the new request and all other requests, then the server prioritizes the requests at step 206 to determine which will be included in the next aggregate request. Priority may be a function of several factors, such as, for example, the identity of the requester, the nature of the requested data, and the amount of bandwidth required to satisfy the request. A request from a senior engineer might be given a high priority than a request from a junior engineer. Similarly, a request for vehicle safety data might be given a higher priority than a request for data that does not impact or reflect vehicle safety.

If the new request is determined to have a higher priority than at least one other request, then the lower-priority request is removed from the next aggregate request and the new request is added to the next aggregate request at step 207. Of course, not all requests will require the same amount of wireless link bandwidth. Therefore, it may be necessary to remove two or more low-priority requests to make room for a single high-priority request. Similarly, removal of one large, low-priority request, may allow the addition of several smaller, higher-priority requests.

If the new request is determined to have a lower priority than the requests already included in the next aggregate request, then an error condition is returned to the requestor indicating the new request cannot be satisfied at step 208. Alternatively or in addition, the new request can be queued for inclusion in a subsequent aggregate request. If, for example, the amount of data requested by others diminishes later in the testing series, there may then be available wireless link bandwidth to satisfy the new request. By storing the new request in a queue, it can be automatically considered for inclusion in a subsequent aggregate request without being resubmitted by the requester.

The request evaluation process may also include a consolidation step (not shown) to determine whether a new request overlaps at least partially with a previous request. Identifying and consolidating overlapping requests may reduce the additional bandwidth required to fulfill new requests depending on the extent of the overlap. For example, if a new request requests data entirely included in a previous request, then no additional bandwidth is required to fulfill the second request. Similarly, if a new request requests data partly included in a prior request, then less bandwidth is required to fulfill the new request.

Figure 3:
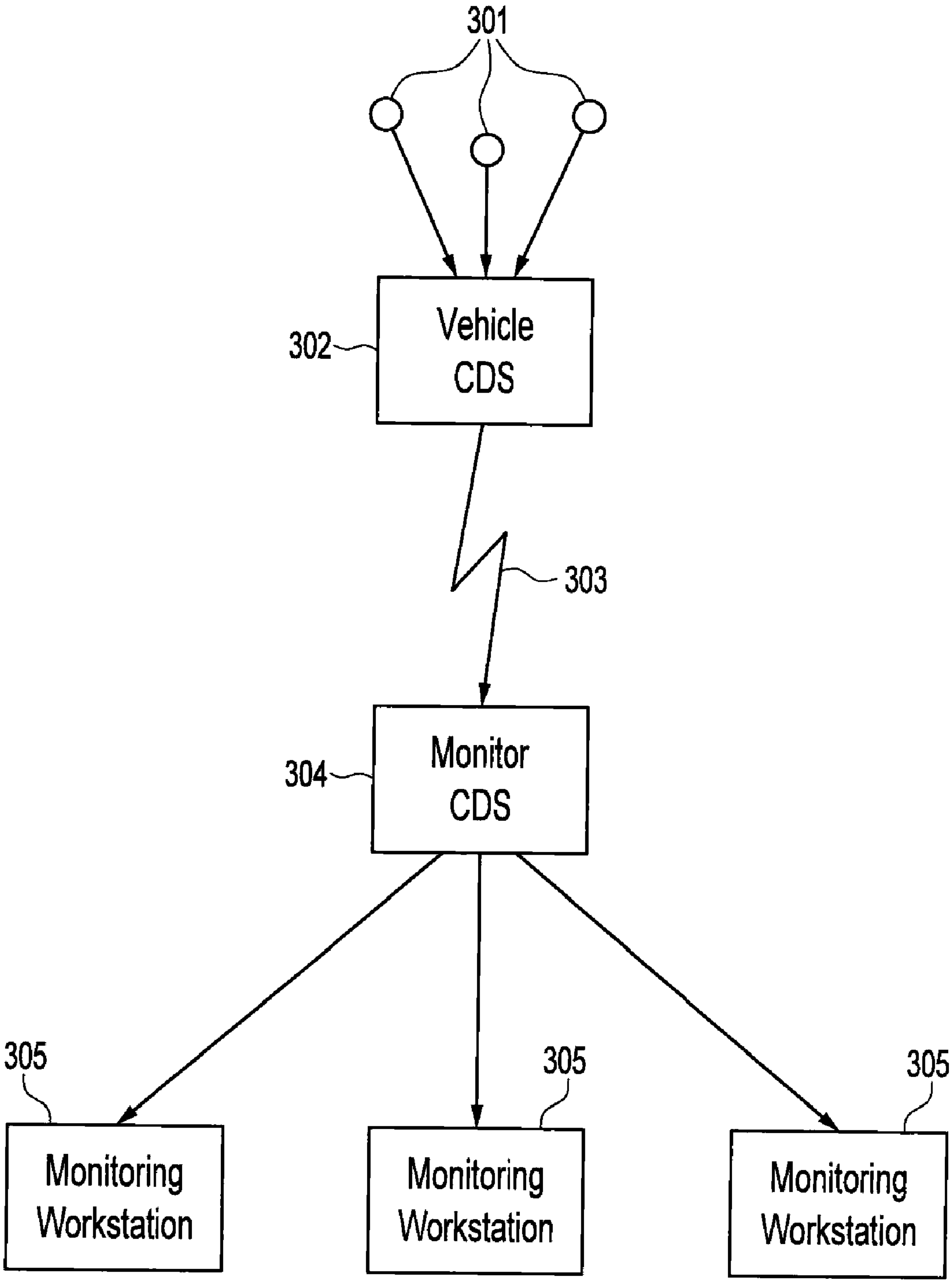
FIG. 3 illustrates the flow of vehicle performance data from sensors to monitoring workstations according to an embodiment disclosed herein.

FIG. 3 illustrates the flow of vehicle performance data from sensors 301 to monitoring workstations 305 according to one embodiment of the disclosure. Vehicle performance data originates at a plurality of sensors 301 aboard the vehicle. Data from the sensors is received as input by a caching data server 302 aboard the vehicle. The vehicle caching data server 302 stores the data in a local memory, for example, one or more hard disk drives or a rugged solid-state memory device, and also determines whether the data or a subset thereof is responsive to an outstanding aggregate request. If at least a portion of the data is responsive, then the responsive data is transmitted via transceivers (not shown) over wireless link 303 to a caching data server 304 at a monitoring station. As it receives data from the vehicle, the caching data server 304 at the monitoring station writes the data to a local storage device and also transmits the data, for example via a local area computer network, to one or more monitoring workstations 305 according to requests received from the monitoring workstations 305. Each monitoring workstation 305 receiving data then displays the data.

Use of the term "wireless link" is not intended to limit the scope of the disclosure to any particular portion of the electromagnetic spectrum or any particular transmission technology. The term is intended only to indicate a transmission means that is at least in part wireless. Although traditional VHF or UHF radio transceivers may be used, any suitable transmission means presently known or hereafter developed may also be employed. For example, the vehicle performance data may be transmitted via satellite relay to provide for longer range communications between a monitoring station and a vehicle. The wireless link may also utilize any suitable communications protocol presently known or hereafter developed, such as, for example, TCP/IP over wireless Ethernet.

One possible embodiment will now be described in further detail by way of specific example. The following does not in any way limit the scope of the claimed invention but merely illustrates one exemplary embodiment thereof.

With reference to FIG. 1, the vehicle 110 in the exemplary embodiment could be an aircraft, for example a commercial airliner or military fighter. The sensors 111 could be those conventionally used to monitor the performance of an aircraft in flight. However, due to the more efficient bandwidth utilization and multi-level caching detailed above, more sensors 111 can be accommodated than in a conventional vehicle monitoring system. The sensors might monitor, for example, airspeed, altitude (both by way of radar and pressure), heading, bank angle, pitch angle, yaw angle, angular and linear acceleration, fuel flow, oil temperature, oil pressure, engine operation, fuel remaining, control surface deflection, stresses on various components of the airframe, position (determined, for example, by GPS), and landing gear status. The caching data server 112 receives data from the sensors 111 and records the data locally. Depending on the output of the sensors 111 and the interface requirements of the data server 112, an intermediate device (not shown) may be required to multiplex, demultiplex, convert, digitize, or otherwise translate or manipulate the sensor data prior to recording.

Continuing the description of one possible exemplary embodiment, the monitoring station 120 could be a hangar or other building on an airport or any other suitable facility. A plurality of users can interface with the monitoring system described herein via respective computer workstations 121 or other electronic devices, including wireless, portable electronic devices. If, as described above, the vehicle 110 being monitored is an aircraft, then the users might include, for example, aeronautical engineers of varying seniority and experience and a flight safety officer. The users can request particular subsets of data from the sensors 111 by submitting a request through software on their workstations 121 or other electronic devices. A second caching data server 122 located, for example, at the monitoring station and connected to the workstations 121 via a network such as, for example an Ethernet-based local area network (LAN), receives, prioritizes, and aggregates the data requests submitted by users via the workstations 121 or other electronic devices. The request processing could occur elsewhere, however, for example on the workstations 121 themselves or in the vehicle data server 112.

In the exemplary embodiment now being described, requests are not immediately and individually passed to the vehicle. Rather, they are evaluated, prioritized, and aggregated to form an aggregate request. In generating the aggregate request, the data server 122 of this exemplary embodiment considers, perhaps among other things, the seniority of the requestor and the bandwidth required to fulfill the request. For example, priority might be quantified on a scale of 0 to 4, with 0 being the highest priority and 4 being the lowest priority. Requests from the flight safety officer might be assigned a priority of 0 while requests from a junior aeronautical engineering might be assigned a priority of 4. Requests from more senior engineers might have intermediate priorities. The bandwidth required to fulfill a request may be a function of the amount of data requested, i.e. the number of sensor outputs, and the extent to which the requested data has already been transmitted to the data server 122. For example, a request for just one parameter, such as altitude, may require little bandwidth. A request for many parameters may require no bandwidth at all if all of the requested data has already been cached on the data server 122 because the same data was previously requested by another user.

The request aggregation and prioritization process of this exemplary embodiment will now be described by reference to a particular exemplary set of requests. Suppose three users submit requests for vehicle data via their respective workstations 121. A flight safety officer requests the altitude and location of the vehicle, in this example an aircraft, and the quantity of fuel remaining. A senior engineer requests stress measurements from many stress sensors located throughout the aircraft. A junior engineer requests the airspeed of the aircraft and the deflection angle of several control surfaces. Assume for purposes of this simplified example, there are no other pending requests, though in reality it is contemplated that there will be dozens or more new, queued, and filled requests at any given time.

Before determining which of the three requests to include in the next aggregate request transmitted to the vehicle, the data server 122 assigns a priority to each request and determines the amount of bandwidth required to fill each request. As indicated above, a request from a safety officer will probably have a very high priority, so the flight safety officer's request for altitude, location, and fuel remaining data is assigned a priority of 0, the highest priority. Although the bandwidth requirement will vary depending on the speed of configuration of wireless link 114, assume for this example that the flight safety officer's request would require 20% of available bandwidth. Requests from a senior engineer would probably, though not necessarily, be assigned a moderately high priority. Thus, assume the senior engineer's request for stress measurement from many stress sensors is assigned a priority of 1, the second highest priority, and, due to the high number of sensors involved, would require 80% of available bandwidth. Requests from a junior engineer would probably, though not necessarily, be assigned a low priority. Thus, assume the junior engineer's request for airspeed and control surface deflection data is assigned a priority of 3, the second lowest priority, and would require 40% of available bandwidth. Of course, if any of the data requested had been previously requested by another user, the bandwidth required to fill the request might be as low as 0%, if all of the requested data is already cached on the data server 122. In this case, the request could be filled immediately and the request need to not be further considered by the prioritization algorithm.

Because the bandwidth required to fill all three requests totals 140% of available bandwidth, the data server 122 must determine which of the requests to fill, then postpone or cancel the other requests. Depending on the desired configuration, data server 122 might be configured to always fill priority 0 requests at the expense of all other requests. Similarly, the data server 122 might be configured to fill priority 4 requests only when bandwidth would otherwise go unused. Alternatively, or in addition, the data server 122 might use a fuzzy logic or other algorithm to rank the requests based on a combination of their respective priority and bandwidth requirement.

Continuing the above example, the flight safety officer's request would likely be filled because it is assigned a priority of 0 and requires only 20% of available bandwidth. A simple prioritization algorithm might select the senior engineer's request to be filled next because it has a higher priority than the junior engineer's request. An alternative prioritization algorithm might consider both the request priority and the bandwidth required to fill each request, and select the junior engineer's request next since it requires only half as much bandwidth as the senior engineer's request. Yet another possible implementation of the prioritization algorithm might choose to fill part of the senior engineer's request and part of the junior engineer's request, thus providing all requesters with at least some of the data they requested.

Once the prioritization algorithm determines which requests, or parts of requests, will be included in the next aggregate request, the data server 122 constructs the aggregate request by consolidating one or more individual requests into a single request. The consolidation process might include eliminating duplication that would occur if, for example, two individual requests both requested historical altitude data from the same or partly the same range of time. Once the aggregate request is formed, it is transmitted via wireless link 114 to the vehicle 110, in this example an aircraft. The data server 112 aboard the aircraft 110 then compiles the requested data and transmits it to the monitoring station 120 via a transceiver 113 and wireless link 114. The data server 122 receives the data from the transceiver 123, stores the data in a cache, and forwards the data to the workstations 121 or other electronic devices associated with the requesting users.

The workstations 121 or other electronic devices then display the data according to preferences set by the user. For example, a workstation 121 might present the data graphically in a waterfall display and permit an engineer to scroll back in time through past data or scroll forward to more recent or even real-time data. Alternatively, the data might be presented numerically, with the numbers fixed at a specified point in time, updated in real-time, or replaying a previous range of time.

Although the request process might seem linear, it is contemplated that various users will submit requests continuously throughout the request, prioritization, aggregation, transmission, and display phases just described. For example, while one workstation 121 is receiving data previously requested from the data server 122, another might be sending a new request to the data server 122. In one embodiment, the data server 122 queues incoming requests until they are included in an aggregate request and fulfilled. Alternatively, the data server 122 might return an error message to a user whose request cannot be immediately fulfilled.

The exemplary embodiment above described the vehicle as an aircraft. This is but one possible application of the systems and methods disclosed herein. In other embodiments, the vehicle may be an automobile on a test track or the open road, a military vehicle at a testing facility or in combat, a boat or other marine vehicle, or even a spacecraft in orbit. As is known by those skilled in the art, the particular hardware and processing algorithms used may be tailored to meet the specific requirements of a particular embodiment. For example, a vehicle beyond the line-of-site of the monitoring station may employ a satellite-based wireless link rather than a VHF or UHF transceiver.

The embodiments described above overcome limitations of the prior art by providing a novel system and method for monitoring vehicle performance with multi-level caching. The description and drawings contained herein should only be considered illustrative of exemplary embodiments and their respective features and advantages. Modification and substitutions to specific processes and structures can be made, as is known by those skilled in the art, without departing from the spirit and scope of the claimed invention.

The invention claimed is:

1. A method for monitoring performance of a vehicle, comprising:
- receiving at a server a request for performance data from a client workstation;
- prioritizing and aggregating, by the server, the request with at least one additional request to form an aggregate request;
- transmitting the aggregate request from the server to the vehicle; and
- receiving at the server a response comprising at least some of the performance data from the vehicle.

2. The method of claim 1, where the transmitting step does not occur until a response to a previous aggregate request has been received.

3. The method of claim 1, wherein the performance data comprises real-time telemetry.

4. The method of claim 1, wherein the prioritizing step comprises excluding at least one request from the aggregate request.

5. The method of claim 1, wherein the prioritizing step is based at least partly on a bandwidth limitation and a priority assigned to each request.

6. The method of claim 1, further comprising scrollably displaying the performance data on the client workstation.

7. A method for monitoring performance of an aircraft, comprising:
- receiving aircraft performance data from a plurality of sensors aboard the aircraft;
- storing the aircraft performance data on an aircraft caching data server;
- aggregating requests for a subset of the aircraft performance data from a plurality of monitoring workstations to derive an aggregate request;
- transmitting the aggregate request from a ground station to the aircraft;
- transmitting at least some of the sensor aircraft performance data to the ground station in response to the aggregate request;
- storing at least some of the aircraft performance data on a ground caching data server; and
- displaying at least one requested subset of the aircraft performance data on the respective monitoring workstation.

8. The method of claim 7, wherein the aggregating step comprises prioritizing the requests and generating a combined request that can be satisfied within available bandwidth.

9. The method of claim 8, wherein the aggregating step further comprises determining whether at least one of the requests overlaps with at least another of the requests and adjusting a bandwidth limitation associated with the at least one request based on an extent of the overlap.

10. The method of claim 8, wherein low-priority requests are excluded from the combined request.

11. The method of claim 8, wherein requests for flight safety data are assigned a high-priority.

12. The method of claim 8, wherein the transmitting steps comprise transmitting via TCP/IP over a wireless Ethernet connection.

13. The method of claim 8, wherein the transmitting steps comprise transmitting via satellite.

14. The method of claim 8, wherein the requests for a subset of the aircraft performance data comprise at least one request for historical data.

15. The method of claim 14, wherein, if the historical data is stored on the ground caching data server, the ground caching data server fills the request for historical data and the request for historical data is not included in the aggregate request.

16. The method of claim 8, wherein the aircraft performance data is compressed prior to transmission.

17. The method of claim 8, further comprising transmitting an additional aggregate request after a response to a previous aggregate request has been received by the ground station.

18. The method of claim 7, wherein the displaying step comprises selectively displaying at least one of real-time data and historical aircraft performance data.

19. The method of claim 7, wherein the displaying step comprises displaying a combination of real-time and historical aircraft performance data.

20. A system for monitoring performance of a vehicle, comprising:
- a plurality of monitoring workstations each configured to transmit a request for performance data in response to a user command;
- a first caching data server configured to receive, prioritize, and aggregate requests for performance data from the workstations; and
- a second caching data server configured to receive an aggregate request from the first caching data server and transmit performance data in response to the aggregate request, wherein the first caching data server is not aboard the vehicle and the second caching server is aboard the vehicle.

21. The system of claim 20, further comprising a first radio transceiver coupled to the first caching data server and configured to wirelessly exchange aggregate request and performance data with a second radio transceiver coupled to the second caching data server.

22. The system of claim 20, wherein each of the plurality of monitoring workstations is configured to scrollably display performance data received from the first caching data server.

23. The system of claim 20, wherein the performance data comprises real-time telemetry.

24. The system of claim 20, further comprising a plurality of sensors aboard the vehicle and configured to transmit performance data to the second caching data server.

25. The system of claim 24, wherein the second caching data server is configured to store substantially all of the performance data received from the plurality of sensors.

26. The system of claim 24, wherein the second caching data server is configured to transmit to the first caching data server a subset of the performance data stored on the second caching data server in response to the aggregate request.

27. The system of claim 20, wherein the first caching data server is further configured to exclude requests from the aggregate request if there is insufficient bandwidth to fill all requests.

28. The system of claim 27, wherein the first caching data server is further configured to exclude a request based on a priority assigned to the request.

29. The system of claim 27, wherein excluded requests are held in a memory and included in a subsequent aggregate request.

30. The system of claim 20, wherein the first caching data server is further configured to hold the aggregate request in a memory until performance data in response to a previous aggregate request has been received from the second caching data server.

31. A method of monitoring performance of a vehicle, comprising:
- receiving via computer network a plurality of requests for performance data from a plurality of monitoring workstations;
- determining whether each request can be satisfied with data in a local cache;
- if a request can be satisfied with data in the local cache:
  - transmitting responsive data from the local cache to a monitoring workstation associated with the request;
- if a request cannot be satisfied with data in the local cache:
  - determining whether the request can be satisfied based at least in part on a bandwidth limitation and a priority assigned to the request;
- if the request can be satisfied:
  - combining the request with at least one other request to form an aggregate request;
- if the request cannot be satisfied:
  - transmitting an error condition to a monitoring workstation associated with the request;
- transmitting the aggregate request to the vehicle;
- receiving responsive performance data from the vehicle in response to the aggregate request; and
- transmitting via the computer network at least a subset of the responsive performance data to at least one monitoring workstation associated with a request included in the aggregate request.

32. The non-transitory computer-readable recording medium of claim 31, wherein the subset of the responsive performance data comprises only performance data responsive to a request associated with the monitoring workstation to which the subset is transmitted.

33. A non-transitory computer-readable recording medium containing instructions for implementing the method of claim 31 on a server.

* * * * *